US011134011B2

(12) United States Patent
Akiyoshi

(10) Patent No.: US 11,134,011 B2
(45) Date of Patent: Sep. 28, 2021

(54) COMMUNICATION SYSTEM, CONTROL DEVICE, COMMUNICATION METHOD, AND PROGRAM

(71) Applicant: NEC Corporation, Tokyo (JP)

(72) Inventor: Ippei Akiyoshi, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/605,642

(22) Filed: Jan. 26, 2015

(65) Prior Publication Data

US 2015/0200850 A1 Jul. 16, 2015

Related U.S. Application Data

(63) Continuation of application No. 13/574,239, filed as application No. PCT/JP2011/005106 on Sep. 12, 2011, now abandoned.

(30) Foreign Application Priority Data

Dec. 1, 2010 (JP) ............................ JP2010-268401

(51) Int. Cl.
*H04L 12/741* (2013.01)
*H04L 12/717* (2013.01)
*H04L 12/721* (2013.01)

(52) U.S. Cl.
CPC .............. *H04L 45/74* (2013.01); *H04L 45/42* (2013.01); *H04L 45/566* (2013.01)

(58) Field of Classification Search
CPC ....................................................... H04L 12/56
See application file for complete search history.

(56) References Cited

U.S. PATENT DOCUMENTS 4,058,672 A 11/1977 Crager et al.
7,002,958 B1 2/2006 Basturk et al.
7,035,259 B2 4/2006 Nomura et al.
8,230,108 B2 7/2012 Pratt, Jr. et al.
8,892,769 B2 11/2014 Pratt, Jr. et al.
(Continued)

FOREIGN PATENT DOCUMENTS

CN 1764154 A 4/2006
EP 1 601 152 A1 11/2005
(Continued)

OTHER PUBLICATIONS

Japanese Office Action dated Aug. 18, 2015 with a partial English translation thereof.

(Continued)

*Primary Examiner* — Sulaiman Nooristany

(57) ABSTRACT

A communication system includes a first node to forward a received packet according to a path identifier included in an additional header, which corresponds to a forwarding path of the received packet, a second node placed in an edge of network, configured of the first node, and to process the received packet according to a packet processing rule, and a controller to send, to the second node, the packet handling rule which indicates to add the additional header to the received packet, wherein the second node requests the packet processing rule to the controller when the packet processing rule for the received packet is not set in the second node.

18 Claims, 12 Drawing Sheets

START
S101 DETECT TOPOLOGY STATE CHANGE
S102 COMPUTE ROUTE
S103 CONSOLIDATE ROUTE INFORMATION
S104 ALLOCATE PATH IDENTIFIER
PROCESSING IN PATH INFORMATION MANAGEMENT UNIT
S105 GENERATE PROCESSING RULE
S106 SET PROCESSING RULE
PROCESSING IN ACTION COMPUTATION UNIT
END

(56) References Cited

U.S. PATENT DOCUMENTS

| | | | | |
|---|---|---|---|---|
| 2001/0019554 | A1* | 9/2001 | Nomura | H04L 45/502 370/389 |
| 2003/0091049 | A1* | 5/2003 | Abe | H04L 12/24 370/392 |
| 2003/0108069 | A1 | 6/2003 | Yamada | |
| 2005/0083936 | A1* | 4/2005 | Ma | H04L 47/2408 370/392 |
| 2006/0083251 | A1 | 4/2006 | Kataoka et al. | |
| 2008/0049746 | A1 | 2/2008 | Morrill et al. | |
| 2008/0189769 | A1* | 8/2008 | Casado | G06F 21/6281 726/4 |
| 2009/0046732 | A1* | 2/2009 | Pratt, Jr. | H04L 12/66 370/406 |
| 2011/0216656 | A1 | 9/2011 | Pratt, Jr. et al. | |
| 2011/0261825 | A1 | 10/2011 | Ichino | |
| 2011/0286359 | A1 | 11/2011 | Shimonishi | |
| 2013/0177016 | A1 | 7/2013 | Nakano et al. | |

FOREIGN PATENT DOCUMENTS

| | | | |
|---|---|---|---|
| JP | 2004-260285 | A | 9/2004 |
| JP | 2004-297839 | | 10/2004 |
| JP | 2005-159983 | A | 6/2005 |
| JP | 2006-050433 | A | 2/2006 |
| JP | 2006-060579 | A | 3/2006 |
| JP | 2006-186855 | A | 7/2006 |
| JP | 2001-251343 | A | 9/2011 |
| JP | 2012-90058 | A | 5/2012 |
| RU | 2140132 | C1 | 10/1999 |
| WO | WO 2008/095010 | A1 | 8/2008 |
| WO | WO 2009-008934 | | 1/2009 |
| WO | WO 2010/103909 | A1 | 9/2010 |
| WO | WO 2010/110235 | A1 | 9/2010 |

OTHER PUBLICATIONS

Yasunobu Chiba et. al., "A proposal of Flow entry Reduction Scheme for Flow-based Networks and Its Implementation on OpenFlow-based Network", IEICE technical report, Feb. 25, 2010, vol. 109, No. 448, p. 7-12.
Russian Office Action dated Apr. 27, 2015 with English Translation.
International Search Report dated Oct. 11, 2011 in PCT/JP2011/005106 (English version).
Office Action dated Sep. 25, 2014 in U.S. Appl. No. 13/574,239.
Notice of Grounds for Rejection dated Jul. 15, 2014, with partial English translation.
Chinese Office Action dated May 19, 2014 with a partial English translation.
Notice of Grounds for Rejection dated Apr. 1, 2014 with partial English translation.
Korean Office Action dated Apr. 1, 2014, with partial English translation.
"MPLS Network Structure and Packet Transmission", Dec. 21, 2004, pp. 1-4 (with English translation).
Nick McKeown, and 7 others, "OpenFlow: Enabling Innovation in Campus Networks", [online], Mar. 14, 2008. http://www.openflowswitch.org//documents/openflow-wp-latest.pdf.
"OpenFlow: Switch Specification" Version 1.0.0. (Wire Protocol 0×01) http://www.openflowswitch.org/documents/openflow-spec-v1.0.0.pdf, Dec. 31, 2009.
Office Action dated May 24, 2016, by the Russian Patent Office in counterpart Russian Patent Application No. 2012138150.
Decision to Grant a Patent dated Feb. 7, 2017, by the Japanese Patent Office in counterpart Japanese Patent Application No. 2016-090505.
Extended European Search Report form the European Patent Office dated Sep. 5, 2017, in counterpart European Patent Application No. 11845923.9.
Donnelly, E., MPLS (Multi-Protocol Label Switching), Jun. 19, 2003 (Jun. 19, 2003), XP055522749, dated Nov. 19, 2018.
Communication Pursuant to Article 94(3) EPC dated Nov. 19, 2018, issued by European Patent Office in Application No. 11845923.9.
European Search Report dated Jun. 9, 2020, issued in counterpart European Patent Application No. EP 20158864.7.

* cited by examiner

Fig. 4

| START POINT FORWARDING NODE | END POINT FORWARDING NODE | PATH IDENTIFIER | ROUTE INFORMATION |
|---|---|---|---|
| FORWARDING NODE 21 | FORWARDING NODE 22 | Path#0001 | FORWARDING NODE 21_#2 → FORWARDING NODE 23_#3 |
| | : | : | : |
| | FORWARDING NODE 26 | Path#000X | FORWARDING NODE 21_#2 → FORWARDING NODE 23_#4 |
| | | Path#000Y | FORWARDING NODE 21_#3 → FORWARDING NODE 24_#2 |
| FORWARDING NODE 22 | : | : | : |
| : | : | : | : |

Fig. 10

| PATH IDENTIFIER | START POINT FORWARDING NODE | END POINT FORWARDING NODE | ROUTE INFORMATION |
|---|---|---|---|
| Path#0001 | FORWARDING NODE 21 | FORWARDING NODE 22 | FORWARDING NODE 21_#2 → FORWARDING NODE 23_#3 |
| : | : | : | : |
| Path#000X | FORWARDING NODE 21 | FORWARDING NODE 26 | FORWARDING NODE 21_#2 → FORWARDING NODE 23_#4 |
| | FORWARDING NODE 23 | FORWARDING NODE 26 | FORWARDING NODE 23_#4 |
| Path#000Y | FORWARDING NODE 21 | FORWARDING NODE 26 | FORWARDING NODE 21_#3 → FORWARDING NODE 24_#2 |
| Path#000Y | FORWARDING NODE 22 | FORWARDING NODE 26 | FORWARDING NODE 22_#2 → FORWARDING NODE 24_#2 |
| : | | : | : |

1A
COMMUNICATION SYSTEM
110
CONTROL DEVICE
120
FLOW SWITCH GROUP
121
122
123
124
125
126
FLOW SWITCH
FLOW SWITCH
FLOW SWITCH
FLOW SWITCH
FLOW SWITCH
FLOW SWITCH
131
132
133
134
COMMUNICATION TERMINAL
COMMUNICATION TERMINAL
COMMUNICATION TERMINAL
COMMUNICATION TERMINAL

COMMUNICATION SYSTEM, CONTROL DEVICE, COMMUNICATION METHOD, AND PROGRAM

The present application is a Continuation Application of U.S. patent application Ser. No. 13/574,239, filed on Jul. 19, 2012, which is based on Japanese Application No. 2010-268401 filed on Dec. 1, 2010 and International Application No. PCT/JP2011/005106 filed on Sep. 12, 2011, the entire contents of which are hereby incorporated by reference.

REFERENCE TO RELATED APPLICATION

The present invention is based upon and claims the benefit of the priority of Japanese patent application No. 2010-268401, filed on Dec. 1, 2010, the disclosure of which is incorporated herein in its entirety by reference thereto.

TECHNICAL FIELD

The present invention relates to a communication system, a communication device, a control device, a control method and computer-readable storage medium storing a program for a forwarding route of a packet flow, and in particular, relates to a communication system, a control device, a communication method, and a computer-readable storage medium storing a program, that realize communication by using forwarding nodes that process a received packet, in accordance with a processing rule matching the received packet.

BACKGROUND

In recent years, technology known as OpenFlow has been proposed (refer to Patent Literature 1, and Non Patent Literatures 1 and 2). In OpenFlow, communication is taken as end-to-end flow, and routing control, recovery from failure, load balancing, and optimization are performed in flow units. An OpenFlow switch functioning as a forwarding node is provided with a secure channel for communication with an OpenFlow controller that is positioned as a control device, and operates according to a flow table in which appropriate addition or rewriting is instructed by the OpenFlow controller. In the flow table are definitions of sets of matching rules (header fields) that refer to packet headers, flow statistical information (Counters), and actions (Actions) defining processing content, for each flow.

An example of a communication system using OpenFlow is described in FIG. 11. As shown in FIG. 11, the communication system 1A is formed of a control device 110 corresponding to the OpenFlow controller, and flow switches 121 to 126 corresponding to OpenFlow switches. The communication system 1A can realize communication between connected communication terminals 131 to 134.

Referring to a sequence of FIG. 12, a description is given of operation of the communication system using the abovementioned OpenFlow. Here, the description is given using an example in which the communication terminal 131 of FIG. 11 starts 2 types of communication with the communication terminal 134.

On receiving a packet for a first communication transmitted by the communication terminal 131 (S901 in FIG. 12), the flow switch 121 searches for a processing rule entry having a matching rule that matches header information of the received packet, from the flow table. As a result of the search, in a case where an entry matching the received packet is not found, the flow switch 121, after buffering the received packet, transmits a new flow detection notification (Packet-In) message having information of the received packet to the control device 110 via a secure channel, and requests determination of a packet forwarding route based on source and destination of the received packet (S902 in FIG. 12).

The control device 110 that receives the request identifies an arrival destination of the packet from information of the new flow detection notification as the communication terminal 134. The control device 110 computes a route reaching the flow switch 126 to which the identified communication terminal 134 is connected, from the flow switch 121, as a forwarding route of the packet for the first communication. Here, a route of flow switch 121→flow switch 123→flow switch 126 is computed as the forwarding route of the packet for the first communication.

The control device 110 transmits a setting (FlowMod) message for a processing rule determining a forwarding rule of a packet realizing the abovementioned forwarding route, to flow switches in the abovementioned route, and stores processing rule entries in respective flow tables (S903-1 to S903-3 in FIG. 12). The flow switch 121 transmits the buffered packet using the processing rule entry that has been set (S904 in FIG. 12). Since processing rule entries are already set in flow tables of the flow switches 123 and 126 in the packet forwarding route in the abovementioned steps S903-2 and S903-3, the flow switches 123 and 126 that receive the packet for the first communication transmitted from the flow switch 121 perform packet forwarding without making a request to determine a packet route to the control device 110.

Next, on receiving a packet for a second communication transmitted by the communication terminal 131 (S905 in FIG. 12), the flow switch 121 searches for a processing rule entry having a matching rule that matches header information of the received packet, from the flow table. Since the second communication uses a different port number from the first, due to an entry matching the received packet not being found, similar to the first communication, the flow switch 121, after buffering the received packet, transmits a new flow detection notification (Packet-In) message having information of the received packet to the control device 110 via the secure channel, and requests determination of a packet forwarding route based on source and destination of the received packet (S906 in FIG. 12).

The control device 110 that receives the request identifies an arrival destination of the packet from information of the new flow detection notification as the communication terminal 134. The control device 110 computes a route reaching the flow switch 126 to which the identified communication terminal 134 is connected, from the flow switch 121, as a forwarding route of the packet for the second communication. Here, a route of the flow switch 121→flow switch 124→flow switch 126 is computed as the forwarding route of the packet for the first communication.

The control device 110 transmits a setting (FlowMod) message for a processing rule determining a forwarding rule of a packet realizing the abovementioned forwarding route, to flow switches in the abovementioned route, and stores processing rule entries in respective flow tables (S907-1 to S907-3 in FIG. 12). The flow switch 121 transmits a buffered packet using the processing rule entry that has been set (S908 in FIG. 12). Since processing rule entries are already set in flow tables of the flow switches 124 and 126 in the packet forwarding route by the abovementioned steps S907-2 and S907-3, the flow switches 124 and 126 that receive the packet for the first communication transmitted from the flow switch 121 perform packet forwarding without making a request to determine a packet route to the control device 110.

[PTL 1]

International Publication WO 2008/095010

[NPL 1]

Nick McKeown, and 7 others, "OpenFlow: Enabling Innovation in Campus Networks", [online], [search conducted Sep. 17, 2010] Internet URL: http://www.openflowswitch.org//documents/openflow-wp-latest.pdf

[NPL 2]

"OpenFlow: Switch Specification" Version 1.0.0. (Wire Protocol 0x01), [search conducted Sep. 17, 2010] Internet URL: http://www.openflowswitch.org/documents/openflow-spec-v1.0.0.pdf

SUMMARY

The entire disclosures of the above cited Patent Literature and Non Patent Literatures are incorporated herein by reference thereto.

The following analysis is given by the present invention.

As described above, according to a communication system using OpenFlow, by controlling a processing rule entry of a switch in a route in flow units, even with communication performed between the same communication terminals, if flow features are different (port numbers in examples of FIG. 11 and FIG. 12 are different), it is possible to realize flexible routing control, such as it being possible to select different routes.

On the other hand, however, the communication system using OpenFlow performs routing control of all flow switches within the communication system by a control device such as an OpenFlow controller. As a result, each time a new flow is generated, there is a problem in that the control device has to set a processing rule in all flow switches in a route taken by a new flow, and control load increases.

The present invention has been made in view of the abovementioned matter and it is an object to provide a communication system, a control device, a communication method, and a program that can lessen the load on the control device that centrally controls forwarding nodes thereunder, as in the OpenFlow controller described above.

According to a first aspect of the present invention, there is provided a communication system that comprises: a plurality of forwarding nodes for which is set a processing rule(s) for forwarding a received packet in accordance with a route set in advance, with a processing rule being selected based on a path identifier included in the received packet, to perform packet forwarding; and a control device that sets the processing rule beforehand in the forwarding node(s) in the route, and causes a forwarding node positioned at a start point of the route to add a path identifier in accordance with the route to a received packet and causes a forwarding node positioned at an end point of the route to delete the path identifier from a received packet, on a predetermined occasion.

According to a second aspect of the present invention, there is provided a control device, connected to a plurality of forwarding nodes for which is set a processing rule(s) that forwards a received packet in accordance with a route set in advance, with a processing rule being selected based on a path identifier included in the received packet, to perform packet forwarding; the control device comprising: a first unit setting the processing rule beforehand in the forwarding nodes in the route; and a second unit causing a forwarding node positioned at a start point of the route to add a path identifier in accordance with the route to a received packet and causing a forwarding node positioned at an end point of the route to delete the path identifier from a received packet, on a predetermined occasion.

According to a third aspect of the present invention, there is provided a communication method that comprises: a step in which, when a new flow is generated, a forwarding node positioned at a start point of a route that has been computed in advance adds a path identifier to a received packet, based on an instruction from a control device, and then forwards to a subsequent hop;

a step in which a forwarding node that is in a route computed in advance selects a processing rule based on the path identifier included in a received packet, from among processing rules set in advance by the control device, and forwards the received packet; and a step in which the forwarding node positioned at an end point of the route restores the received packet to before the path identifier was added, based on an instruction from the control device, and then forwards to a subsequent hop. The present method is tied up with specific apparatuses, known as a transfer node and a control device that configure the communication system.

According to a fourth aspect of the present invention, there is provided a computer-readable storage medium storing a program executed in a control device connected to a plurality of forwarding node for which is set a processing rule that forwards a received packet in accordance with a route set in advance, with a processing rule being selected based on a path identifier included in the received packet, and packet forwarding being performed; wherein the program executes a process of setting the processing rule beforehand in the forwarding node in the route, and a process, at a predetermined occasion, of respectively executing addition and deletion of the path identifier in accordance with the route, in forwarding nodes positioned at a start point and an end point of the route. It is to be noted that that the program can be recorded in a computer readable storage medium, which may be a non-transient recording medium. That is, the present invention can be embodied as a computer program product.

The meritorious effects of the present invention are summarized as follows.

According to the present invention it is possible to lighten the load on a control device that centrally controls forwarding nodes thereunder.

BRIEF DESCRIPTION OF DRAWINGS

FIG. 4 is a diagram for describing content stored in a path information storage unit of the control device of the first exemplary embodiment;

FIG. 10 is a diagram for describing content stored in a path information storage unit of the control device of the second exemplary embodiment;

PREFERRED MODES

Figure 1:
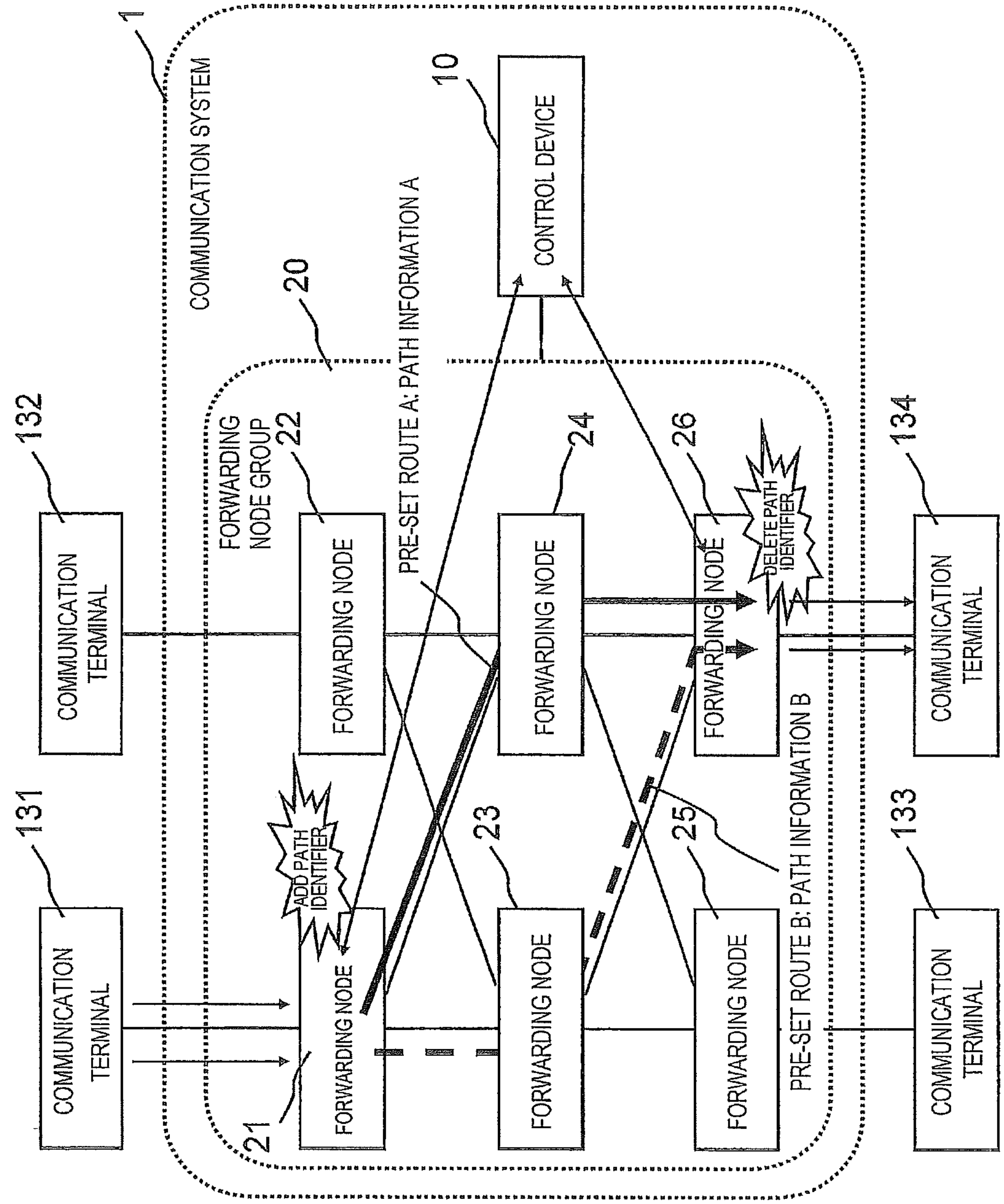
FIG. 1 is a diagram for describing an outline of the present disclosure.

First, an outline of an exemplary embodiment of the present disclosure is described. As shown in FIG. 1, the exemplary embodiment of the present invention can be implemented by forwarding nodes 21 to 26 wherein a processing rule that forwards a received packet in accordance with routes set in advance (pre-set routes A and B of FIG. 1) is set, with a processing rule being selected based on a path identifier included in the received packet, and packet forwarding being performed; and a control device 10 that sets the processing rule beforehand in the forwarding nodes (forwarding nodes 21, 23, 24, and 26 in FIG. 1) that are in the route. The control device 10 also causes a forwarding node positioned at a start point of the route to add a path identifier in accordance with the route to a received packet and causes a forwarding node positioned at an end point of the route to delete the path identifier from a received packet when a new flow is generated (forwarding nodes 21 and 26 in FIG. 1). It is to be noted that drawing reference symbols noted in this outline are added for convenience to respective elements as one example in order to aid understanding, and are not intended to limit the invention to modes of the drawings shown.

Specifically, implementation is realized by a step in which, when a new flow is generated from a communication terminal 131 with a communication terminal 134 as a destination, the forwarding node 21 positioned at a start point of a route has been computed in advance, adds a path identifier (for example, a path identifier A for a pre-set route A) to the received packet, based on an instruction from the control device, and then forwards to a subsequent hop; a step in which the forwarding node 24 that is in the route computed in advance selects a processing rule based on the path identifier (for example, path identifier A) included in the received packet, and forwards the received packet to the forwarding node 26; and a step in which the forwarding node 26 positioned at the end point of the route restores the received packet to before the path identifier was added, based on an instruction from the control device, and then forwards to a subsequent hop.

In the same way, it is possible to select the pre-set route B as a forwarding route of the new flow, and to perform packet forwarding.

As described above, according to the present invention, since there is no need for a request to set a processing rule from a forwarding node (excepting forwarding nodes at the start and end points) in a route that has been set in advance, it is possible to reduce the load on the control device 10.

First Exemplary Embodiment

Figure 2:
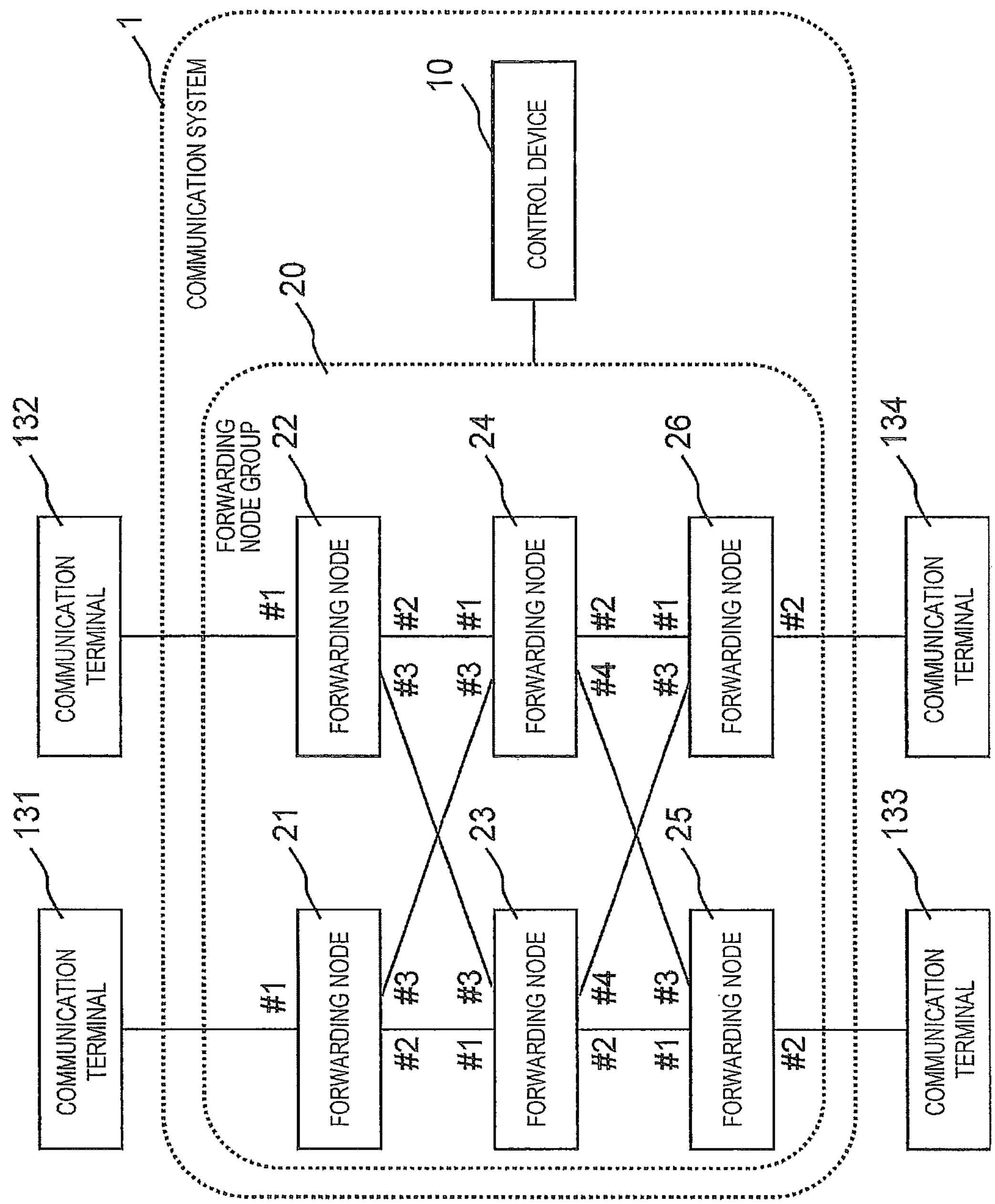
FIG. 2 is a diagram showing a configuration example of a communication system according to a first exemplary embodiment of the present disclosure.

Next, a detailed description is given concerning a first exemplary embodiment of the present disclosure making reference to the drawings. FIG. 2 is a diagram showing a configuration example of a communication system according to the first exemplary embodiment of the present disclosure. Referring to FIG. 2, the communication system 1 formed from a control device 10 and a forwarding node group 20 is shown.

The forwarding node group 20 is formed from a plurality of forwarding nodes 21 to 26.

In addition, communication terminals 131 to 134 are connected to the communication system 1.

It is to be noted that symbols such as #1 and #2 noted beside the forwarding nodes indicate port numbers with respect to the respective forwarding nodes.

In order to simply describe the present exemplary embodiment, the two terms of "edge node" and "core node" are defined here. The edge node indicates a forwarding node at a start point or an end point of a path to be described later. A core node indicates a forwarding node that is not a start point nor an end point of a path to be described later.

Here, in order to efficiently describe the exemplary embodiment below, the words "route" and "path" are defined. A "route" relates to information formed by one or more forwarding nodes that are passed by data packets transmitted and received between communication terminals performing communication via the communication system 1. Furthermore a "route" possesses directionality. For example, when two communication terminals use the same forwarding nodes for going and returning, routes for going and returning are different. In contrast to this, a "path" is built from one or more "routes", and relates to setting granularity of a packet forwarding rule in a forwarding node belonging to core nodes in the communication system 1. As a result, viewed from a specific route, an edge node and a core node exist exclusively from one another, but from a viewpoint of a forwarding node, forwarding nodes also exist that take roles of both an edge node and a core node, being an edge node in a certain route and a core node in another route.

Furthermore, in the following exemplary embodiment, a description is given that assumes packet forwarding is performed such that, with an edge node, a path identifier described later for identifying a path is embedded in a destination MAC address of a packet, and a core node looks at the path identifier embedded in the destination MAC address to decide an action. A place where the path identifier is embedded can be a wide variety of places such as an unused header field or the like.

Figure 3:
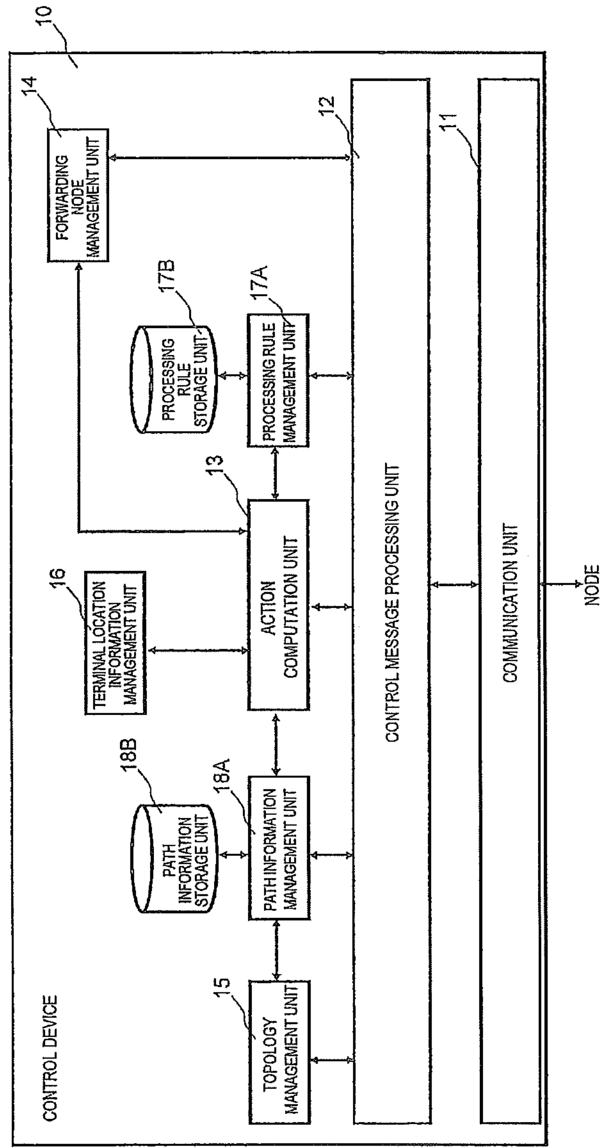
FIG. 3 is a diagram showing a configuration example of a control device according to the first exemplary embodiment.

FIG. 3 is a diagram representing a detailed configuration of the control device 10 of FIG. 2. Referring to FIG. 3, the control device 10 is configured by being provided with a communication unit 11 that performs communication with the forwarding nodes 21 to 26, a control message processing unit 12, an action computation unit 13, a forwarding node management unit 14, a topology management unit 15, a terminal location information management unit 16, a processing rule management unit 17A, a processing rule storage unit 17B, a path information management unit 18A and a path information storage unit 18B. These respectively operate as follows.

The control message processing unit 12 analyzes a control message received from the forwarding nodes 21 to 26 and delivers control message information to a relevant processing means inside the control device 10.

The action computation unit 13 calls for an action to be executed in a forwarding node in the forwarding route of a packet based on location information of a communication terminal managed by the terminal location information management unit 16, and path information built in the path information management unit 18A.

The forwarding node management unit 14 manages capability (for example, number and type of ports, types of action supported, and the like) of forwarding nodes controlled by the control device 10.

The topology management unit 15 builds network topology information based on connection relationships of forwarding nodes collected via the communication unit 11. Furthermore, if a change is seen in the topology information, notification thereof is provided to the path information management unit 18A.

The terminal location information management unit 16 manages information for identifying the location of a communication terminal connected to the communication system. In the present exemplary embodiment, a description is given in which, with an IP address as information for distinguishing the communication terminal, being information for identifying the location of the communication terminal, usage is made of information for distinguishing a forwarding node to which the communication terminal is connected and information of a port thereof. Clearly, a terminal and its location may also be identified using other information instead of these items of information.

The processing rule management unit 17A performs management regarding what type of processing rule is set in which forwarding node. Specifically, a result calculated in the action computation unit 13 is recorded in the processing rule storage unit 17B as a processing rule, and the processing rule is set in the forwarding node, and recording information of the processing rule storage unit 17B is updated in response to a case also where a change occurs in the processing rule set in the forwarding node, by a processing rule deletion notice from the forwarding node.

The path information management unit 18A manages path information used in communication inside the communication system 1. Specifically, when there is a change in the topology configuration of the communication system 1, a route used in communication is derived, a path having setting granularity of a processing rule set in a core node is computed from the route, a unique identifier is allocated within the forwarding node group 20 for each path and recorded in the path information storage unit 18B, and in coordination with the action computation unit 13, the processing rule set in the core node (not depending on a request from the core node) is updated.

Furthermore, the path information management unit 18A returns the relevant path information when path information is requested from the action computation unit 13. FIG. 4 is a diagram for describing path information stored in the path information storage unit 18B. The path information is formed of a start point forwarding node, an end point forwarding node, a path identifier, and route information.

The start point forwarding node and the end point forwarding node are forwarding nodes respectively relating to the start point and the end point of the route. As information for distinguishing the forwarding nodes used here, the IP address or MAC address of the forwarding nodes may be used, or other dedicated identifiers may be used.

The path identifier is information of fixed length for uniquely distinguishing, within the forwarding node group 20, path information defined at the route information described later.

The route information is information indicating specific information of a path selected as a path used in communication between communication terminals by the path information management unit 18A, by a combination of one or more of forwarding node(s) and port information thereof. For example, with regard to route information of an entry distinguished by Path #000X of FIG. 4, passage from port #2 of the forwarding node 21 to port #4 of the forwarding node 23, and arrival at the forwarding node 26 which is an end forwarding node is understood (refer to pre-set route B of FIG. 1).

Furthermore, as is understood from a table configuration of FIG. 4, a path in the present exemplary embodiment, in a single direction, corresponds 1 to 1 with a route specified between 2 specific forwarding nodes.

It is to be noted that, in the abovementioned configuration, in a case where it is not necessary to hold a processing rule in the control device 10, the processing rule storage unit 17B can be omitted. In addition, a configuration can also be adopted in which the processing rule storage unit 17B and the path information storage unit 18B are provided in a separate external server or the like.

The control device 10 as described above can also be realized by a configuration in which the abovementioned the path information management unit 18A is added, based on the OpenFlow controller of Non Patent Literatures 1 and 2.

Furthermore, respective parts (processing means) of the control device 10 shown in FIG. 1 can also be realized by a computer program that causes the abovementioned respective processing to be executed in a computer forming the control device 10, using hardware thereof.

It is to be noted that respective parts (processing means) of the control device 10 shown in FIG. 2 can also be realized by a computer program that causes the abovementioned respective processing to be executed in a computer forming the control device 10, using hardware thereof.

On receiving a packet, the forwarding nodes 21 to 26 find a processing rule having a matching rule (reference rule) that matches the received packet, from the processing rule storage unit that stores processing rules, and implement processing (for example, forwarding to a specific port, flooding, dropping, and the like) as in an action attached to the processing rule.

Furthermore, each time a packet is processed, the forwarding nodes 21 to 26 reset a timer (providing time out information) within an action field of the processing rule in question. When the timer becomes (counts up to) 0, the forwarding nodes 21 to 26 delete the processing rule in question from the processing rule storage unit. In this way, it is possible to prevent a situation where a processing rule that is no longer used remains forever and an unintended action is executed.

It is to be noted that the forwarding nodes 21 to 26 described above can also be realized in a configuration equivalent to an OpenFlow switch of Non Patent Literatures 1 and 2. In this case, the respective processing rule storage unit corresponds to a flow table storing flow entries of an OpenFlow switch of Non Patent Literature 1.

Next, a detailed description is given concerning operation of the present exemplary embodiment, making reference to the drawings. First, a description is given concerning presetting of a processing rule to a core node by the control device 10.

Figure 5:
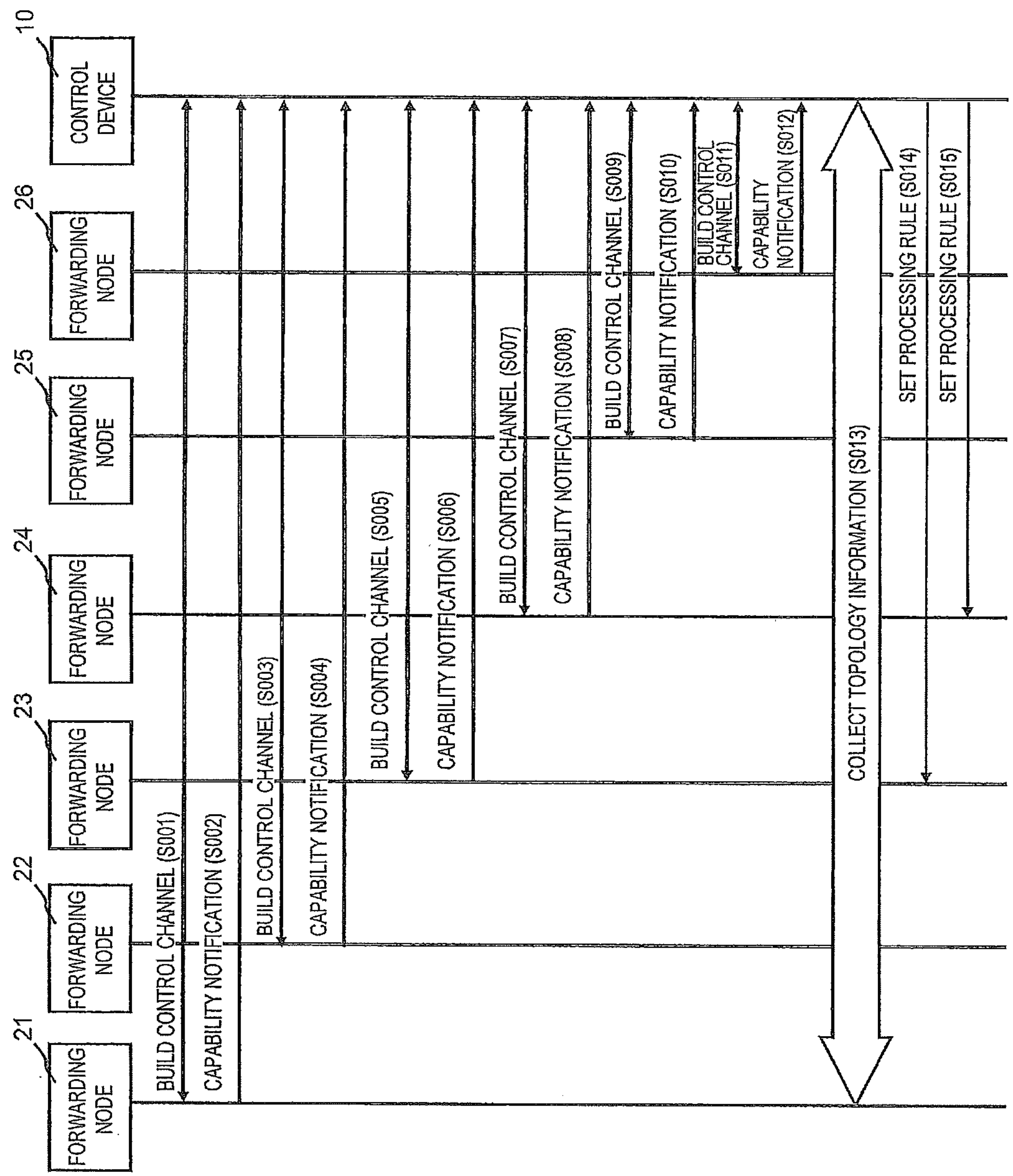
FIG. 5 is a sequence diagram showing an operational example (pre-setting of processing rule) of the first exemplary embodiment.

FIG. 5 is a sequence diagram representing a series of procedures when the control device 10 pre-sets a processing rule in a core node.

Referring to FIG. 5, first, when the forwarding node 21 starts, a control channel is built with the control device 10 (S001 in FIG. 5). The control channel established here is a connection of a TCP (Transmission Control Protocol) using a port number for the control channel, or an SSL (Secure Socket Layer). The forwarding node 21 gives notification of information about itself to the control device 10, via a forwarding capability notification message (S002 in FIG. 5).

Here, for information transmitted by the forwarding node 21 to the control device 10, for example, an identifier of the forwarding node itself (the reference symbol 21 of the forwarding node in the present exemplary embodiment), respective port information, information of supported actions, and the like are cited. As the control device 10 and the forwarding node 21, in a case of using the OpenFlow controller and OpenFlow switch of Non Patent Literatures 1 and 2, it is possible to use a Feature Request/Reply message, as the forwarding capability notification message.

Besides, as an identifier of forwarding node itself, an IP address, for example, can be transmitted. Clearly, information other than the IP address may be transmitted as an identifier. The port information is, for example, a port identifier of each port of a forwarding node, types of links (link type information) connected to the respective ports, and information related to links connected to the respective ports. As an identifier of the abovementioned port, it is possible to use, for example, a port number. The link type information is information representing, for example, link types of different frame types such as Ethernet (registered trademark), fiber channel, and the like. The content of information related to links changes according to the link type. For example, in a case where the link type is Ethernet (registered trademark), a MAC address, supported communication speed, communication system or method (for example, full duplex, half duplex), and the like can be cited as information related to links. The information related to the links can also be referred to as link attribute information. The action information is, for example, in addition to normal packet forwarding, information of supported actions such as MAC address conversion, IP address conversion, L4 port number conversion, and the like.

On receiving a forwarding capability notification message from the forwarding node 21, the control device 10 stores content thereof in the forwarding node management unit 14.

In the same way, the control device 10 builds the forwarding nodes 22 to 26 and the control channel, and stores forwarding capability of the forwarding nodes 22 to 26 in the forwarding node management unit 14 (S003 to S012 of FIG. 5).

When collection of forwarding capabilities of the respective forwarding nodes is completed, the control device 10 performs a topology search within the forwarding node group 20, as advance preparation in order to derive path information that a core node uses in forwarding of data packets, and stores a result thereof in the topology management unit 15 (S013 in FIG. 5).

When the topology information is updated, the path information management unit 18A performs derivation of path information used by the core node in forwarding a data packet, and sets a processing rule based on the path information in forwarding nodes (forwarding nodes 23 and 24 of FIG. 2 and FIG. 5) that form core nodes in collaboration with the action computation unit 13 (S014 and S015 of FIG. 5).

Figure 6:
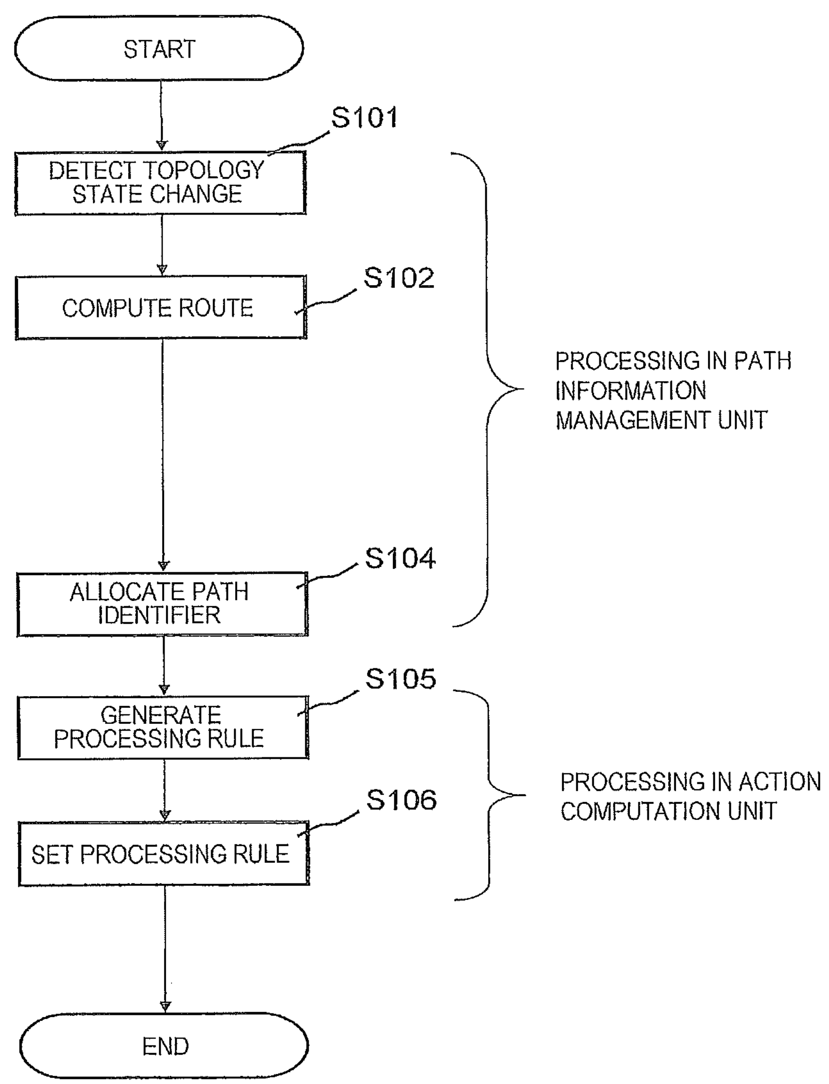
FIG. 6 is a flow diagram representing processing flow of the control device after step S013 of FIG. 5.

Next, a description is given concerning flow in setting a processing rule by the path information management unit 18A of the abovementioned control device 10, making reference to FIG. 6.

On detecting that a topology state has changed according to a notification or the like from the topology management unit 15 (step S101), the path information management unit 18A computes a route used in communication between communication terminals based on the topology information after the change (step S102).

Next, the path information management unit 18A allocates a path identifier to the computed route, to be recorded in the path information storage unit 18B as path information (step S104). When the path information management unit 18A gives notification of path information to the action computation unit 13, the action computation unit 13 creates a processing rule to be set in a core node from among received path information (step S105), and sets the processing rule in the forwarding node in question (step S106). Here, the processing rule created by the action computation unit 13 uses a destination MAC address in which a path identifier is embedded as a matching rule (reference rule), and an action is described that forwards to a port number specified by route information of the path information (refer to FIG. 4).

Figure 7:
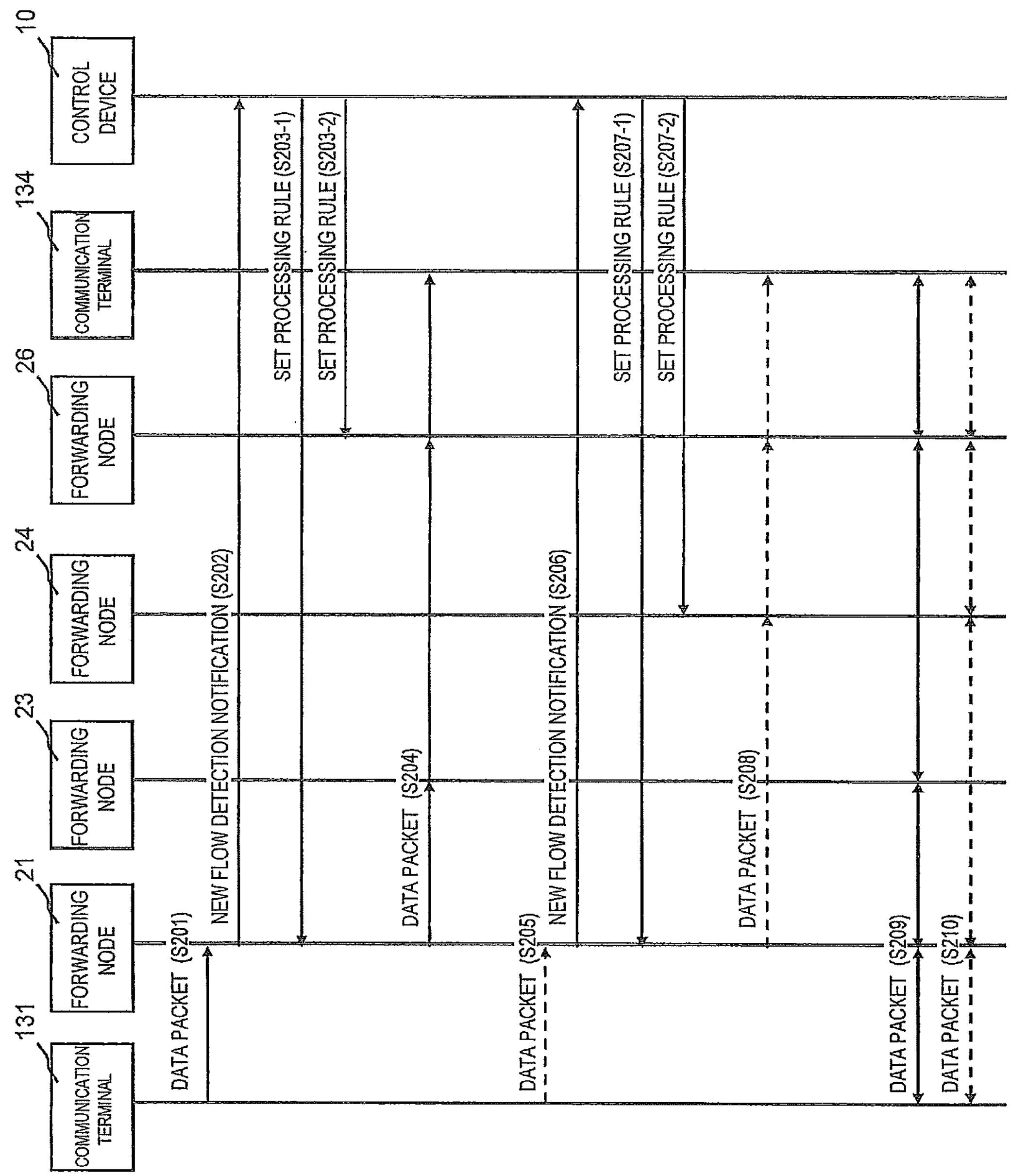
FIG. 7 is a sequence diagram showing an operational example (when a new flow is generated) of the first exemplary embodiment.

Next, referring to FIG. 7, a description is given concerning flow of actual communication using a processing rule that has been pre-set as described above. In the description below, a description is given using an example in which the communication terminal 131 of FIG. 2 starts 2 types of communication in which different ports are used, with the communication terminal 134 (as a destination).

First, the communication terminal 131 transmits a data packet for a first communication to a destination of the communication terminal 134 (S201 in FIG. 7).

On receiving the data packet, the forwarding node 21 searches for a processing rule having a matching rule (reference rule) that matches the received packet, from the processing rule storage unit 17B. However, since the packet is a first packet from the communication terminal 131 with a destination of the communication terminal 134, a relevant processing rule does not exist. Therefore, after buffering the received packet, the forwarding node 21 transmits a new flow detection notification to the control device 10 (S202 in FIG. 7). This new flow detection notification includes information necessary for identification and creation of a processing rule (for example, MAC address, IP address, port number (each including both a source and a destination)), and packet reception port information.

It is to be noted that instead of sending only the information necessary for identification and creation of a processing rule as described above to the control device 10, the forwarding node 21 may transmit also the received packet itself to the control device 10.

On receiving the new flow detection notification, the control device 10 performs identification of a source IP address, the forwarding node that detects the new flow, and an input port thereof, from information included in the new flow detection notification, in the action computation unit 13. If there is a change in location information of a communication terminal (communication terminal 131) having the same IP address stored in the terminal location information management unit 16, the action computation unit 13 records the forwarding node and input port information thereof included in the new flow detection notification as location information.

Next, the action computing unit 13 refers to the terminal location information management unit 16, and identifies location information of the communication terminal 134, from the destination IP address included in the new flow detection notification.

When the location identification of the source and destination communication terminals is completed, the action computation unit 13 requests path information corresponding to a route with a start point forwarding node as the forwarding node 21 and an end point forwarding node as the forwarding node 26, to the path information management unit 18A.

The path information management unit 18A refers to the path information storage unit 18B, selects a path identifier from information of the start point and end point forwarding nodes, and gives notification of corresponding path information to the action computation unit 13.

It is to be noted that in a case where there are a plurality of path identifiers sharing the start point and end point forwarding nodes, selection may be made of one path identifier from among them, based on a predetermined algorithm. In the present exemplary embodiment, there is no particular limitation with regard to this algorithm, but, citing an example, consideration can be given to an algorithm such as random selection, round robin selection, or collaborating with the processing rule management unit 17A to make a selection with fewer used path identifiers. Here, Path #000X is selected as a path identifier.

On obtaining the path information, the action computation unit 13 determines a matching rule (reference rule) for the new processing rule and computes an action to be executed by the forwarding node 21 and the forwarding node 26 that are edge nodes. Here, as the matching rule (reference rule), the IP address and port number of both source and destination are determined respectively with respect to the communication terminals 131 and 134.

After converting the destination MAC address to Path #000X in the forwarding node 21 that is the start point forwarding node, the action computation unit 13 computes an action forwarding to port #2 of forwarding node 21 based on the path information. As to the forwarding node 26 that is the end point forwarding node, after converting (restoring) the destination MAC address to the MAC address of the communication terminal 134, the action computation unit 13 computes an action forwarding to port #2 of forwarding node 26 that is location information for the communication terminal 134. Above conversion of MAC address to Path #000X corresponds to the addition and deletion of the path identifier.

The control device 10 creates a processing rule based on the determined matching rule (reference rule) and action, to be set in the forwarding nodes 21 and 26 that are the start point and the end point forwarding nodes (S203-1 and S203-2 in FIG. 7).

After setting the processing rule, the control device 10 registers the processing rule set in the forwarding nodes 21 and 26 in the processing rule management unit 17A.

As described above, when setting of the processing rule is complete, the forwarding node 21 converts the MAC address of the first data packet, which is buffered, in accordance with the processing rule, and then forwards to the forwarding node 23. Since pre-setting of the processing rule has already been performed, in the forwarding node 23 that receives this packet, being on a route corresponding to the path information (refer to S014 of FIG. 5), the packet is forwarded in sequence to the forwarding nodes 21, 23, and 26, and reaches the communication terminal 134 (S204 of FIG. 7).

Next, the communication terminal 131 transmits a data packet for a second communication belonging to a communication flow different to the abovementioned data packet, to a destination of the communication terminal 134 (S205 in FIG. 7).

On receiving the data packet, the forwarding node 21 searches for a processing rule having a matching rule (reference rule) that matches the received packet, from the processing rule storage unit 18B. However, since with regard to this packet, the port number used for the first data packet is different, no relevant processing rule exists. Therefore, after buffering the received packet, the forwarding node 21 transmits a new flow detection notification to the control device 10 (S206 in FIG. 7).

Subsequent processing is the same as processing for the first data packet, outside of selection of Path #000Y (refer to FIG. 4) by the control device 10 as the path identifier. When setting of the processing rule in the start point and end point forwarding nodes is completed, and a packet is transmitted in accordance with the processing rule from the start point forwarding node 21, since pre-setting of the processing rule has already been performed, in the forwarding node 24 that receives this packet, (refer to S015 of FIG. 5), the packet is forwarded in sequence to forwarding nodes 21, 24, and 26, and reaches the communication terminal 134 (S208 of FIG. 7).

Thereafter, the packet with a destination of the communication terminal 134 from the terminal device 131 is transmitted by 2 routes, in accordance with the 2 processing rules described above (S209 and S210 of FIG. 7).

As described above, according to the present exemplary embodiment, since the new flow detection notification from the core node is not received, and furthermore, it is sufficient if the control device 10 sets the processing rule in the start point and end point forwarding nodes, it is possible to reduce the load on the control device 10 and to perform high speed packet forwarding.

According to the present exemplary embodiment, even with packet for which communication is performed between the same communication terminals, it is possible to forward packets belonging to different communications by respectively different routes. A reason for this is that a processing rule is set in which information, which is held by both edge nodes and core nodes, referred to as path identifiers, is taken as a matching rule (reference rule).

Furthermore, as is also clear from the exemplary embodiment described above, the present disclosure can be applied without depending on the size of the communication system. A reason for this is because of a feature in that, since the path itself is specified by an identifier of fixed length, without describing path information by a forwarding node group on a route or an action sequence thereof, or identifying a flow, the information amount is constant and does not depend on the forwarding nodes passed through.

Furthermore, in the present exemplary embodiment, since a system is used in which the path identifiers are embedded in arbitrary fields that can be restored within a packet, there is also a successful result whereby processing need not be added for packet fragmenting and restoration thereof in a forwarding node that is a start point or an end point of the route.

In the same way, in the present exemplary embodiment processing with respect to the core nodes is also simplified, and there is no need for additional processing such as label replacing as performed in MPLS (Multi-Protocol Label Switching).

It is to be noted that in the exemplary embodiment described above, when the new flow detection notification is received, the control device 10 only sets a route in a transmission direction of the data packet, but setting of both directions (a direction from the communication terminal 131 to the communication terminal 134, and a direction from the communication terminal 134 to the communication terminal 131) may be done at the same time. In this case, the action computation unit 13 may reverse the start point and end point forwarding nodes, and check once again with the path information management unit 18A, and may also return path information of both directions, with regard to a request for path information of a single direction by the path information management unit 18A.

Furthermore, in the exemplary embodiment described above, the destination MAC address was used as a field in which the path identifier is embedded, but there is no particular limitation with regard to field type. For example, it is possible to use a field that can be restored at the end point forwarding node, such as the source MAC address, the source IP address, the destination IP address, and the like, as a field with the path identifier embedded. In addition it is possible to employ a system in which an action adding a new header, as in encapsulation, is set, and the path identifier is embedded in this added header.

Furthermore, in the exemplary embodiment described above, a description was given in which the control device 10 performs setting of a processing rule with arrival of a data packet at a forwarding node as a trigger event, but the processing rule may also be set at an occasion other than the data packet reception. For example, if it becomes clear that traffic is generated at a decided point in time, by traffic information and the like collected from forwarding nodes, a processing rule may be set in the start point and end point forwarding nodes in advance.

Second Exemplary Embodiment

Next, a detailed description is given concerning a second exemplary embodiment of the present disclosure making reference to the drawings. In the first exemplary embodiment described above, path information and route corresponded 1 to 1, but consideration can be given to the fact that, in accordance with topology becoming complicated, the number of path identifiers, that is, of entries of processing rules set in core nodes, will increase. Therefore, in the second exemplary embodiment, plural routes, which use the same forwarding node as end point forwarding nodes of the routes, are consolidated, and one path identifier is given. Since the basic configuration otherwise is the same as in the first exemplary embodiment described above, a description is given below centered on points of difference.

Figure 8:
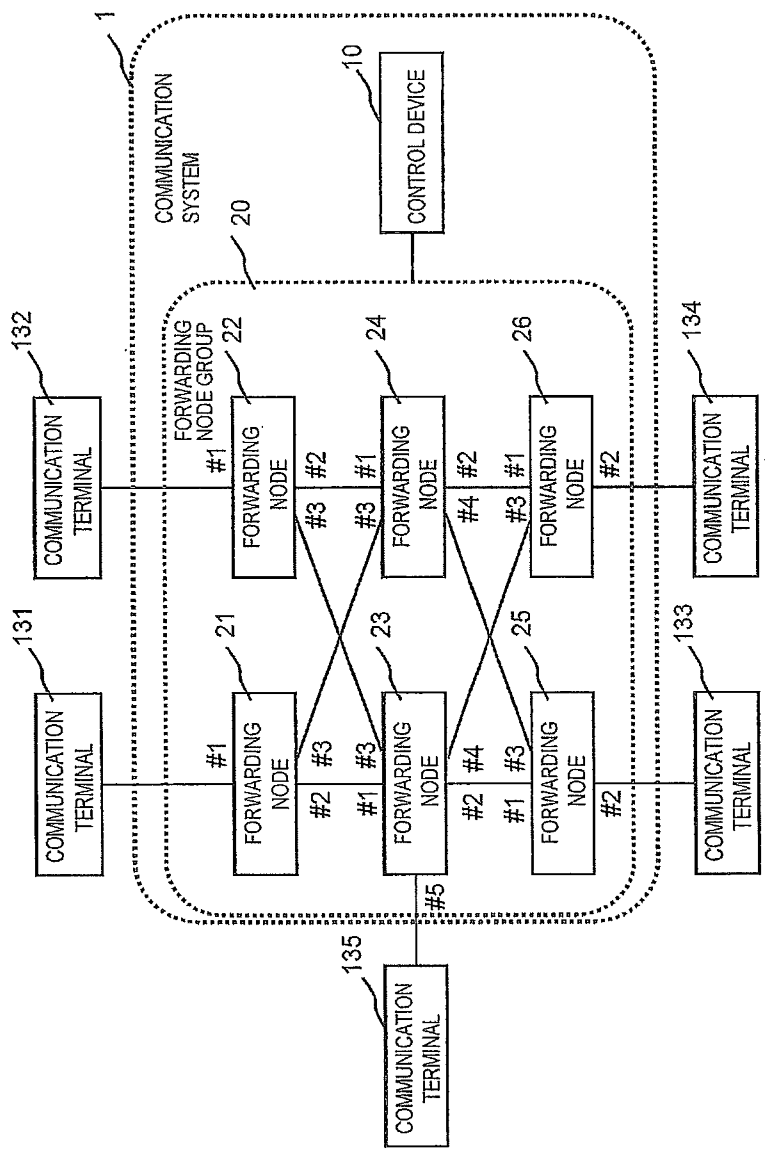
FIG. 8 is a diagram showing a configuration example of a communication system according to a second exemplary embodiment of the present disclosure.

FIG. 8 is a diagram showing a configuration example of a communication system of the second exemplary embodiment of the present invention. A point of difference from a configuration of the first exemplary embodiment described above resides in the point that a communication terminal 135 is connected to a port #5 of the forwarding node 23.

Figure 9:
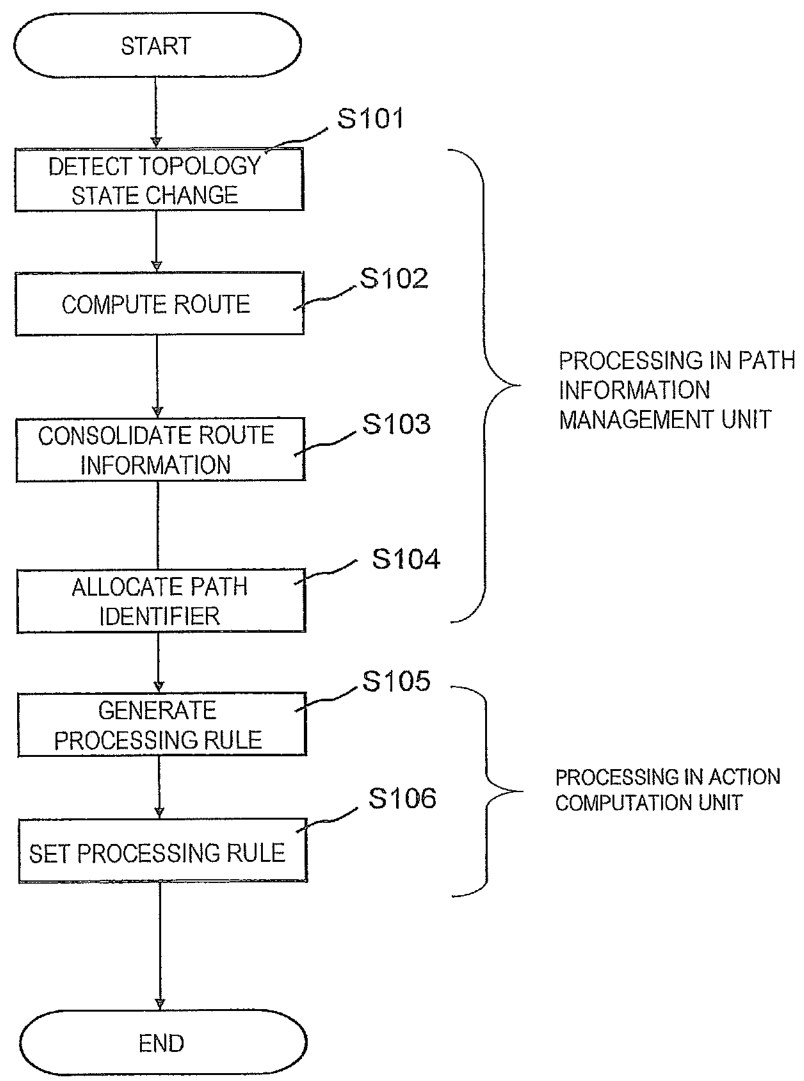
FIG. 9 is a flow diagram representing processing flow of a control device according to the second exemplary embodiment.
Figure 11:
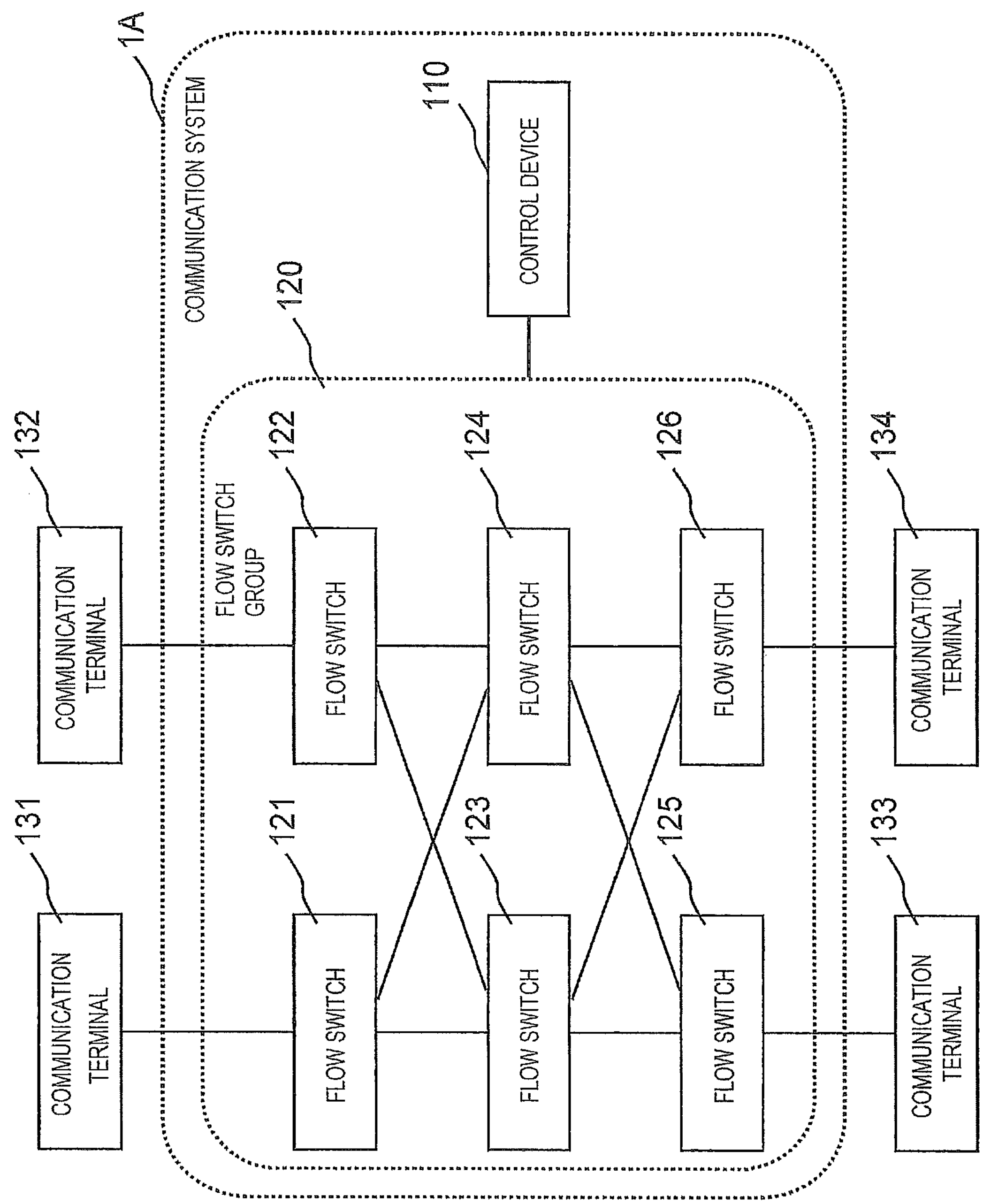
FIG. 11 is a diagram for describing a configuration example of a communication system of Non Patent Literatures 1 and 2.
Figure 12:
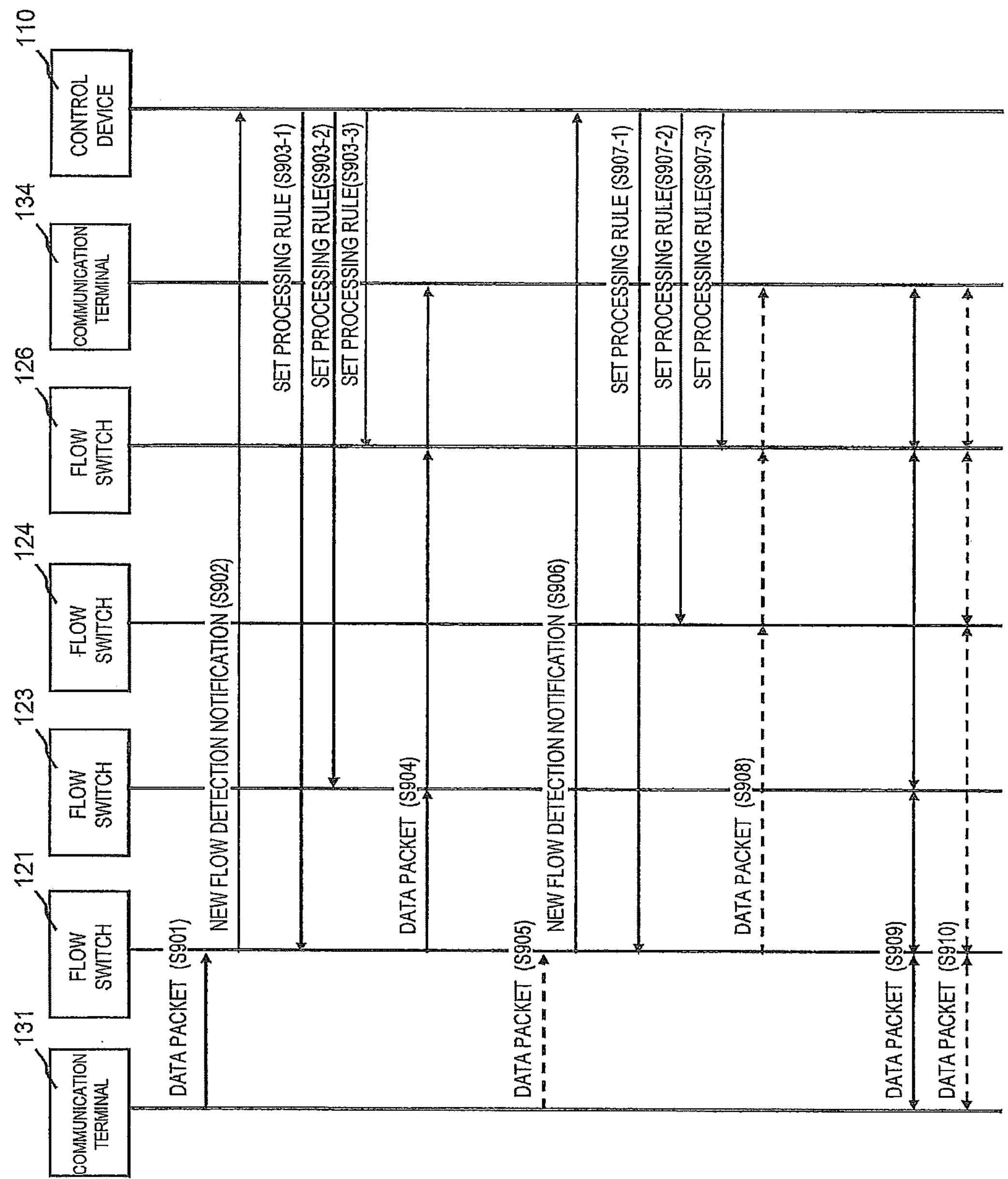
FIG. 12 is a sequence diagram for describing an operational example of the communication system of Non Patent Literatures 1 and 2.

In the present exemplary embodiment, pre-setting of a processing rule to a core node by a control device 10 is performed (refer to FIG. 5). FIG. 9 is a diagram representing flow in setting a processing rule by a path information management unit 18A of the control device 10 of the present exemplary embodiment.

A point of difference from the first exemplary embodiment shown in FIG. 6 resides in the point that, after finishing route computation (step S102), consolidated processing of route information is performed (step S103).

In the consolidated processing of the route information described above, the same forwarding node is used as an end point forwarding node in the routes, and processing is performed to give the same path identifier to plural routes having duplicated paths.

FIG. 10 shows a configuration example of path information stored in a path information storage unit 18B. In the example of FIG. 8, similar to a path information storage unit of the first exemplary embodiment described using FIG. 4, the path information is configured by a path identifier, a start point forwarding node, an end point forwarding node, and route information. However, in order to improve readability, the arrangement of constituent elements in the table is changed (different) from respect to FIG. 4.

In the example of FIG. 8, a path identifier Path #000X is allocated to a route with a forwarding node 21 as a start point forwarding node, and a forwarding node 26 as an end point forwarding node, encompassing a route with a forwarding node 23 as a start point forwarding node, and the forwarding node 26 as an end point forwarding node. Furthermore, a path identifier Path #000Y is allocated to a route tree configured by a route with the forwarding node 21 as a start point forwarding node, and the forwarding node 26 as an end point forwarding node, and a route with forwarding node 22 as a start point forwarding node, and the forwarding node 26 as an end point forwarding node.

Pre-setting of a processing rule thereafter and operations after a new flow detection notification are the same as the first exemplary embodiment described above.

In the present exemplary embodiment, it is possible to obtain an effect of being able to further reduce the number of processing rules set in a core node, by consolidating a plurality of routes in one path.

A description has been given above of preferred exemplary embodiments of the present disclosure, but the present invention is not limited to the abovementioned exemplary embodiments, and further modifications, substitutions, and adjustments can be added within a scope that does not depart from a fundamental technological concept of the present invention. For example, the number of forwarding nodes shown in each of the exemplary embodiments described above is an example, and the number thereof is not limited.

Furthermore, in the exemplary embodiments described above there was only one forwarding node group included in the communication system 1, but a plurality of forwarding node groups is also possible. In this case, the forwarding node group is regarded as one virtual forwarding node, and it is possible to perform management by allocating a path identifier to each forwarding node group. In a case where communication is performed via a plurality of forwarding node groups, processing for a case where there is one forwarding node group as described in the present exemplary embodiment may be performed in each of the forwarding node groups.

Furthermore, in the exemplary embodiments described above, a description was given in which packets for routing control are Ethernet (registered trademark) frames, but an IP packet that does not include an Ethernet (registered trademark) header is also possible. It is to be noted that each disclosure of the abovementioned Patent Literature and Non Patent Literatures is incorporated herein by reference thereto. Modifications and adjustments of exemplary embodiments are possible within the bounds of the entire disclosure (including the scope of the claims) of the present invention, and also based on fundamental technological concepts thereof. Furthermore, a wide variety of combinations and selections of various disclosed elements is possible within the scope of the claims of the present invention. That is, the present invention clearly includes every type of transformation and modification that a person skilled in the art can realize according to the entire disclosure including the scope of the claims and to technological concepts thereof.

Finally, preferred modes of the present disclosure are summarized in the following.

(First Mode)

(Refer to the communication system according to the first aspect described above.)

(Second Mode)

With regard to the first mode, the communication system wherein a control device causes the forwarding nodes positioned at a start point and an end point of said route to execute addition and deletion of the path identifier in accordance with the route, at an occasion when a new flow detection notification is received from the forwarding node.

(Third Mode)

With regard to the first or the second mode, the communication system wherein the control device is provided with: a route information storage unit that manages a plurality of routes formed by the forwarding nodes and path identifiers associated with said routes respectively; a route information management unit that selects an appropriate route from the route information storage unit, when a new flow is generated; and an action computation unit that sets a processing rule in advance, in a forwarding node in a route selected from the route information storage unit, and also sets a processing rule respectively executing addition and deletion of the path identifier in accordance with the route, in forwarding nodes positioned at a start point and an end point of the selected route.

(Fourth Mode)

With regard to any of the first to the third mode, in the communication system, the control device performs re-computation of a route between arbitrary forwarding nodes and sets a processing rule corresponding to the route, each time a change of topology of a network formed by the forwarding nodes is detected.

(Fifth Mode)

With regard to the fourth mode, the communication system gives the same path identifier to routes having an overlapping section, with the same end point forwarding node, among routes between the arbitrary forwarding nodes.

(Sixth Mode).

(Refer to the control device according to the second aspect described above.)

(Seventh Mode)

With regard to the sixth mode, the control device causes the forwarding nodes positioned at a start point and an end point of said route to execute addition and deletion of the path identifier in accordance with the route, at an occasion when a new flow detection notification is received from the forwarding node.

(Eighth Mode)

With regard to the sixth or seventh mode, the control device is further provided with: a route information storage unit that manages a plurality of routes formed by the forwarding nodes and path identifiers associated with said routes respectively; a route information management unit that selects an appropriate route from the route information storage unit, when a new flow is generated; and an action computation unit that sets a processing rule in advance, in a forwarding node in a route selected from the route information storage unit, and also sets a processing rule respectively executing addition and deletion of the path identifier in accordance with the route, in forwarding nodes positioned at a start point and an end point of the selected route.

(Ninth Mode)

With regard to any of the sixth to the eighth modes, the control device performs re-computation of a route between arbitrary forwarding nodes and sets a processing rule corresponding to the route, each time a change of topology of a network formed by the forwarding nodes is detected.

(Tenth Mode)

With regard to the ninth mode, the control device gives the same path identifier to routes having an overlapping section, with the same end point forwarding node, among routes between the arbitrary forwarding nodes.

(Eleventh Mode)

(Refer to the communication method according to the third aspect described above)

(Twelfth Mode)

(Refer to the program according to the fourth aspect described above)

Each of the function units and method steps may be comprehended as and implemented by means for performing each function or steps, particularly relating to the processing means or steps for calculating particular physical parameters concerned.

EXPLANATIONS OF SYMBOLS

1 communication system
10 control device
11 communication unit
12 control message processing unit
13 action computation unit
14 forwarding node management unit
15 topology management unit
16 terminal location information management unit
17A processing rule management unit
17B processing rule storage unit
18A path information management unit
18B path information storage unit
20 forwarding node group
21-26 forwarding node
131-135 communication terminal

What is claimed is:

1. A control apparatus comprising:

a memory configured to store a network topology including a plurality of edge forwarding nodes and a plurality of core forwarding nodes interconnecting the plurality of edge forwarding nodes for communication between communication terminals; and a processor configured to execute program instructions to:

identify, based on the network topology data and location information of the communication terminals, a plurality of paths, each path indicating a forwarding sequence for packet forwarding from an edge forwarding node positioned at a start point of the path, through one or more core forwarding nodes, to an edge forwarding node positioned at an end point of the path;

allocate a plurality of path identifiers for the identified paths, wherein each path identifier uniquely corresponds to each identified path;

send a first instruction to the plurality of core forwarding nodes, the first instruction instructing the plurality of core forwarding nodes to preset the plurality of path identifiers therein;

receive, from a first edge forwarding node, a new communication flow detection notification, in response to the first edge forwarding node receiving a packet belonging to the new communication flow;

select a first path identifier from the plurality of path identifiers, the first path identifier corresponding to a first path for forwarding the packet;

send a second instruction to the first edge forwarding node, the second instruction instructing the first edge forwarding node to add the selected first path identifier to the packet, wherein core forwarding nodes along the first path forward the packet based on the added first path identifier in the packet and the preset plurality of path identifiers; and send a third instruction to a second edge forwarding node positioned at an end point of the first path, the third instruction instructing the second edge forwarding node to remove the added first path identifier from the packet.

2. The control apparatus according to claim 1, wherein the processor is further configured to execute the program instructions to send the first instruction to the plurality of core forwarding nodes before the first edge forwarding node receives the packet belonging to the new communication flow.

3. The control apparatus according to claim 1, wherein the processor is further configured to execute the program instructions to receive, from the first edge forwarding node, a request for processing the packet received by the first edge forwarding node.

4. The control apparatus according to claim 1, wherein the second instruction instructs the first edge forwarding node to add the path identifier to an address field of the packet.

5. The control apparatus according to claim 1, wherein the first instruction includes a first flow entry, and the second instruction includes a second flow entry.

6. The control apparatus according to claim 1, wherein the processor is further configured to execute the program instructions to identify the second instruction after sending the first instruction.

7. A network system comprising:

a core forwarding node configured to forward a packet;

a plurality of edge forwarding nodes configured to forward a packet; and a control apparatus configured to control the core forwarding node and the edge forwarding node, wherein the control apparatus comprises:

a memory configured to store a network topology including the plurality of edge forwarding nodes and the core forwarding node, the core forwarding nodes interconnecting the plurality of edge forwarding nodes for communication between communication terminals; and a processor configured to execute program instructions to:

identify, based on the network topology data and location information of the communication terminals, a plurality of paths, each path indicating a forwarding sequence for packet forwarding from an edge forwarding node positioned at a start point of the path, through one or more core forwarding nodes, to an edge forwarding node positioned at an end point of the path;

allocate a plurality of path identifiers for the identified paths, wherein each path identifier uniquely corresponds to each identified path;

send a first instruction to the plurality of core forwarding nodes, the first instruction instructing the plurality of core forwarding nodes to preset the plurality of path identifiers therein;

receive, from a first edge forwarding node, a new communication flow detection notification, in response to the first edge forwarding node receiving a packet belonging to the new communication flow;

select a first path identifier from the plurality of path identifiers, the first path identifier corresponding to a first path for forwarding the packet;

send a second instruction to the first edge forwarding node, the second instruction instructing the first edge forwarding node to add the selected first path identifier to the packet, wherein core forwarding nodes along the first path forward the packet based on the added first path identifier in the packet and the preset plurality of path identifiers; and send a third instruction to a second edge forwarding node positioned at an end point of the first path, the third instruction instructing the second edge forwarding node to remove the added first path identifier from the packet.

8. The network system according to claim 7, wherein the processor is further configured to execute the program instructions to send the first instruction to the plurality of core forwarding nodes before the first edge forwarding node receives the packet belonging to the new communication flow.

9. The network system according to claim 7, wherein the processor is further configured to execute the program instructions to receive, from the first edge forwarding node, a request for processing the packet received by the first edge forwarding node.

10. The network system according to claim 7, wherein the second instruction instructs the first edge forwarding node to add the path identifier to an address field of the packet.

11. The network system according to claim 7, wherein the first instruction includes a first flow entry, and the second instruction includes a second flow entry.

12. The network system according to claim 7, wherein the processor is further configured to execute the program instructions to identify the second instruction after sending the first instruction.

13. A network control method comprising:

identifying, based on the network topology data and location information of the communication terminals, a plurality of paths, each path indicating a forwarding sequence for packet forwarding from an edge forwarding node positioned at a start point of the path, through one or more core forwarding nodes, to an edge forwarding node positioned at an end point of the path;

allocating a plurality of path identifiers for the identified paths, wherein each path identifier uniquely corresponds to each identified path;

sending a first instruction to the plurality of core forwarding nodes, the first instruction instructing the plurality of core forwarding nodes to preset the plurality of path identifiers therein;

receiving, from a first edge forwarding node, a new communication flow detection notification, in response to the first edge forwarding node receiving a packet belonging to the new communication flow;

selecting a first path identifier from the plurality of path identifiers, the first path identifier corresponding to a first path for forwarding the packet;

sending a second instruction to the first edge forwarding node, the second instruction instructing the first edge forwarding node to add the selected first path identifier to the packet, wherein core forwarding nodes along the first path forward the packet based on the added first path identifier in the packet and the preset plurality of path identifiers; and sending a third instruction to a second edge forwarding node positioned at an end point of the first path, the third instruction instructing the second edge forwarding node to remove the added first path identifier from the packet.

14. The network control method according to claim 13, further comprising: sending the first instruction to the plurality of core forwarding nodes before the first edge forwarding node receives the packet belonging to the new communication flow.

15. The network control method according to claim 13, further comprising: receiving, from the first edge forwarding node, a request for processing the packet received by the first edge forwarding node.

16. The network control method according to claim 13, wherein the second instruction instructs the first edge forwarding node to add the path identifier to an address field of the packet.

17. The network control method according to claim 13, wherein the first instruction includes a first flow entry, and the second instruction includes a second flow entry.

18. The network control method according to claim 13, wherein the second instruction is identified after sending the first instruction.

* * * * *